(12) United States Patent
Kamada et al.

(10) Patent No.: US 11,975,515 B2
(45) Date of Patent: May 7, 2024

(54) SURFACE-PROTECTIVE FILM

(71) Applicant: BANDO CHEMICAL INDUSTRIES, LTD., Hyogo (JP)

(72) Inventors: Yutaka Kamada, Hyogo (JP); Hiroki Uozumi, Hyogo (JP)

(73) Assignee: BANDO CHEMICAL INDUSTRIES, LTD., Hyogo (JP)

(*) Notice: Subject to any disclaimer, the term of this patent is extended or adjusted under 35 U.S.C. 154(b) by 351 days.

(21) Appl. No.: 17/266,101

(22) PCT Filed: Aug. 6, 2019

(86) PCT No.: PCT/JP2019/030867
§ 371 (c)(1),
(2) Date: Feb. 4, 2021

(87) PCT Pub. No.: WO2020/032012
PCT Pub. Date: Feb. 13, 2020

(65) Prior Publication Data
US 2021/0323292 A1 Oct. 21, 2021

(30) Foreign Application Priority Data
Aug. 10, 2018 (JP) .................... 2018-151014

(51) Int. Cl.
*B32B 27/40* (2006.01)
*B32B 7/06* (2019.01)
*B32B 27/16* (2006.01)

(52) U.S. Cl.
CPC ............ *B32B 27/40* (2013.01); *B32B 7/06* (2013.01); *B32B 27/16* (2013.01);
(Continued)

(58) Field of Classification Search
CPC ..................................... B32B 27/40
See application file for complete search history.

(56) References Cited

U.S. PATENT DOCUMENTS

2009/0305049 A1* 12/2009 Kobuchi ............... B32B 27/40
428/476.3
2018/0086882 A1* 3/2018 Kondo ..................... C08F 2/50
(Continued)

FOREIGN PATENT DOCUMENTS

| CN | 107429113 | 12/2017 |
| CN | 108323163 | 7/2018 |

(Continued)

OTHER PUBLICATIONS

JP 2017-148991 Machine Translation (Year: 2017).*
(Continued)

*Primary Examiner* — Zachary M Davis
(74) *Attorney, Agent, or Firm* — JCIPRNET

(57) ABSTRACT

The present invention addresses the problem of providing a surface-protective film which is excellent in terms of antiglare property, scratch resistance, and oil resistance. Provided as a means for solving the problem is a surface-protective film which comprises a protective layer constituted of a polyurethane, both surfaces of the protective layer being flat, and a hardcoat layer formed on one of the surfaces of the protective layer, wherein the hardcoat layer has an arithmetic average roughness Ra of equal to or greater than 0.1 and equal to or less than 0.8 μm.

8 Claims, 2 Drawing Sheets

(52) U.S. Cl.
CPC ... *B32B 2307/538* (2013.01); *B32B 2307/584* (2013.01); *B32B 2307/732* (2013.01); *B32B 2457/208* (2013.01)

(56) References Cited

U.S. PATENT DOCUMENTS

| | | | |
|---|---|---|---|
| 2018/0345639 | A1 | 12/2018 | Kamada et al. |
| 2020/0124772 | A1* | 4/2020 | Nakata ............... C09D 151/003 |

FOREIGN PATENT DOCUMENTS

| | | | | |
|---|---|---|---|---|
| JP | 2011236335 | A * | 11/2011 | ............. C08G 18/10 |
| JP | 2015052100 | | 3/2015 | |
| JP | 2017148991 | | 8/2017 | |
| WO | 2016159023 | | 10/2016 | |
| WO | 2017094480 | | 6/2017 | |
| WO | 2018038069 | | 3/2018 | |
| WO | 2018066697 | | 4/2018 | |

OTHER PUBLICATIONS

Surface Roughness Comparison Website, https://edmprecision.com/surface-roughness-comparison/, available Dec. 4, 2016, Accessed Apr. 27, 2023 (Year: 2016).*

Machine translation of JP 2011-236335 (Year: 2011).*

"International Preliminary Report on Patentability (Form PCT/IB/373) of PCT/JP2019/030867," dated Feb. 16, 2021, with English translation thereof, pp. 1-14.

"Office Action of China Counterpart Application", dated Sep. 19, 2022, with English translation thereof, pp. 1-14.

"International Search Report (Form PCT/ISA/210) of PCT/JP2019/030867," dated Sep. 10, 2019, with English translation thereof, pp. 1-4.

"Office Action of China Counterpart Application", dated May 16, 2023, with English translation thereof, p. 1-p. 16.

* cited by examiner

SURFACE-PROTECTIVE FILM

CROSS-REFERENCE TO RELATED APPLICATION

This application is a 371 of international application of PCT application serial no. PCT/JP2019/030867, filed on Aug. 6, 2019, which claims the priority benefit of Japan application no. 2018-151014, filed on Aug. 10, 2018. The entirety of each of the above-mentioned patent applications is hereby incorporated by reference herein and made a part of this specification.

TECHNICAL FIELD

The present invention relates to a surface-protective film for protecting a transparent substrate on a display surface.

BACKGROUND ART

In an electronic device provided with displays, such as smartphones, tablet PCs, and mobile music players, surface-protective films may be attached in order to protect transparent substrates on display surfaces. The surface-protective films are required to have light transmittance, non-coloring property, weather resistance, plasticizer resistance, contamination proofing property, and the like. Also, these electronic devices have typically been adapted to be operated using capacitance touch panels in recent years, and writing performance for touch pens, operability, scratch resistance, self-recovery property in which films pressed by the tips of touch pens recover to their original states with time, and the like have been additionally required.

As such surface-protective films, the present applicants have proposed, as Patent Literature 1, a surface-protective film in which three layers, namely a protective layer constituted of polyether polyol, aliphatic isocyanate, an alcohol-based curing agent, and a thermally-curable polyurethane that is a hardened product with a non-amine-based catalyst, a transparent base material film, and an adhesive layer are laminated in sequence, and have proposed, as Patent Literature 2, a surface-protective film in which three layers, namely a protective layer constituted of a polycarbonate-based polyurethane, a transparent base material film, and an adhesive layer are laminated in sequence.

Since surface-protective films are operated with the fingers, various oil components of sebum, food oils, cosmetics, hand creams, and the like adhere thereto from the fingers. Since there may be cases in which oil components adhering to a surface-protective film are not wiped off and remain on the surface-protective film for a long period of time, surface-protective films are required to have high oil resistance.

CITATION LIST

Patent Literature

[Patent Literature 1]
International Publication No. 2017/094480
[Patent Literature 2]
International Publication No. 2018/038069

SUMMARY OF INVENTION

Technical Problem

An objective of the present invention is to provide a surface-protective film that is excellent in terms of antiglare property, scratch resistance, and oil resistance.

Solution to Problem

Configurations of the present invention to solve the aforementioned problem are as follows.

1. A surface-protective film including:
    a protective layer comprising a polyurethane, both surfaces of the protective layer being flat; and
    a hardcoat layer formed on one of the surfaces of the protective layer,
    wherein the hardcoat layer has an arithmetic average roughness Ra of equal to or greater than 0.1 µm and equal to or less than 0.8 µm.
2. The surface-protective film according to 1, wherein the thickness of the protective layer is equal to or greater than 50 µm and equal to or less than 300 µm.
3. The surface-protective film according to 1 or 2, wherein the thickness of the hardcoat layer is equal to or greater than 0.5 µm and equal to or less than 5 µm.
4. The surface-protective film according to any one of 1 to 3, wherein the hardcoat layer comprises a hardened product of an ionizing radiation curable resin composition containing a fluorine-containing compound.
5. The surface-protective film according to any one of 1 to 4, wherein the polyurethane is a polycarbonate-based or polyester-based polyurethane.
6. The surface-protective film according to any one of 1 to 5, wherein a transparent base material film comprising of a resin other than a polyurethane is provided on the other surface of the protective layer.
7. A surface-protective film laminate including:
    a mold releasing film laminated on the surface of the surface-protective film according to any one of 1 to 6 on the side of the hardcoat layer; and
    a releasing film laminated on the other surface of the surface-protective film.
8. A method for manufacturing a surface-protective film, wherein the surface-protective film includes a protective layer comprising a polyurethane, both surfaces of the protective layer being flat and a hardcoat layer being formed on one of the surfaces of the protective layer, in which the hardcoat layer has an arithmetic average roughness Ra of equal to or greater than 0.1 µm and equal to or less than 0.8 µm, the method for manufacturing a surface-protective film including:
    applying to an ionizing radiation curable resin composition to an uneven surface of an unevenness transfer film and half-curing the ionizing radiation curable resin composition to form a first gap maintaining member including a half-cured hardcoat layer;
    continuously feeding the first gap maintaining member and a second gap maintaining member using a pair of rolls separately disposed in a state in which the half-cured hardcoat layer faces the second gap maintaining member and pouring a material composition into a clearance between the first gap maintaining member and the second gap maintaining member;
    thermally curing the material composition in a state in which the material composition is held between the first gap maintaining member and second gap maintaining member to obtain the protective layer; and
    fully curing the half-cured hardcoat layer to obtain the hardcoat layer.
9. The method for manufacturing a surface protective film according to 8, wherein the ionizing radiation curable resin composition contains a fluorine-containing compound.

Advantageous Effects of Invention

The surface-protective film according to the present invention includes the hardcoat layer with an arithmetic average roughness Ra of equal to or greater than 0.1 μm and equal to or less than 0.8 μm and is excellent in antiglare property, scratch resistance, and oil resistance. The surface-protective film according to the present invention can have further improved oil resistance by the hardcoat layer being formed of the ionizing radiation curable resin composition containing a fluorine-containing compound, and swelling and color change are unlikely to occur even if oil components of sebum, food oils, cosmetics, hand creams, or the like adhere thereto over a long period of time.

The surface-protective film according to the present invention including the protective layer with a thickness of equal to or greater than 50 μm and equal to or less than 300 μm satisfies the requirements regarding optical property with which the surface-protective film according to the present invention can be used as a surface protective film and is superior in terms of self-recovery property and a writing feeling when using a touch pen.

The surface-protective film according to the present invention including the hardcoat layer with a thickness of equal to or greater than 0.5 μm and equal to or less than 5 μm has excellent adhesion between the hardcoat layer and the protective layer, is unlikely to cause inter-layer peeling, and is excellent in terms of scratch resistance.

The protective layer constituted of a polycarbonate-base polyurethane is excellent in terms of plasticizer resistance, and the protective layer constituted of a polyester-based polyurethane is excellent in terms of plasticizer resistance and oil resistance. The protective film using the protective layer constituted of such a polyurethane is superior in terms of oil resistance.

The surface-protective film laminate obtained by laminating the mold releasing film and the releasing film on the surface-protective film according to the present invention has a protected hardcoat layer and adhesive layer and is excellent in terms of handleability.

According to the manufacturing method of the present invention, it is possible to continuously manufacture a protective film that is excellent in terms of adhesion between the protective layer and the hardcoat layer and has antiglare property. Further, it is possible to manufacture the protective layer with a thickness of equal to or greater than 50 μm and equal to or less than 300 μm, which is difficult to be manufactured by a wet application method, without degrading optical property.

DESCRIPTION OF EMBODIMENTS

Figure 1:
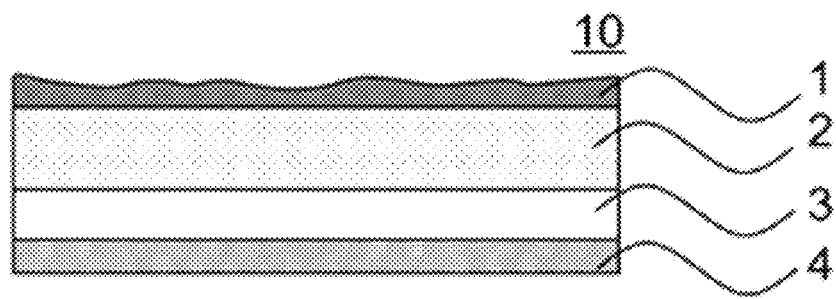
FIG. 1 is a diagram illustrating a surface-protective film according to an embodiment of the present invention.
Figure 2:
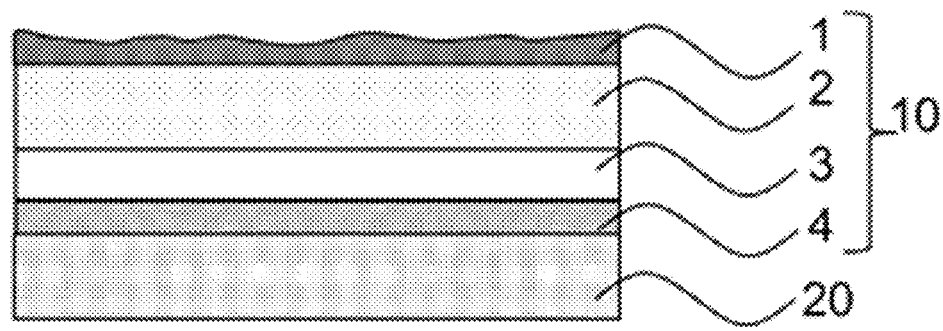
FIG. 2 is a diagram illustrating the appearance of the surface-protective film according to the embodiment of the present invention attached to a transparent substrate on a display surface.

FIGS. 1 and 2 illustrate a surface-protective film according to an embodiment of the present invention and the appearance of the surface-protective film according to the embodiment attached to a transparent substrate located on a display surface, respectively. Note that in FIGS. 1 and 2, the thickness of each layer does not mean an actual thickness.

A surface-protective film 10 according to the embodiment includes four layers, namely a hardcoat layer 1, a protective layer 2, a transparent base material film 3, and an adhesive layer 4 laminated in sequence. Also, the surface-protective film 10 according to the embodiment is attached to a transparent substrate 20 via the adhesive layer 4.

In this manner, the surface-protective film according to the present invention prevents scratching, cracking, contamination, and the like of the transparent substrate by being attached to the surface of the transparent substrate.

"Protective Layer"

The protective layer is constituted of a polyurethane. The polyurethane is obtained by causing a material composition containing at least a polyol, an isocyanate, and an alcohol-based curing agent to react.

a. Polyol

Examples of the polyol include: polyether-based polyols such as polyoxyalkylene glycols such as polyethylene glycol, polypropylene glycol, or polyoxytetramethylene glycol, or alkylene oxide adducts thereof such as bisphenol A, or ethylene oxide or propylene oxide adducts of glycerin; polyester-based polyols obtained through a polymerization reaction of a dibasic acid such as an adipic acid, phthalic anhydride, isophthalic acid, maleic acid, or fumaric acid and glycols such as ethylene glycol, propylene glycol, 1,4-butanediol, 1,6-hexanediol, or trimethylolpropane; polycaprolactone-based polyols such as polycaprolactone glycol, polycaprolactone triol, or polycaprolactone tetraol; polycarbonate-based polyols such as polycarbonate glycols, polycarbonate triols, or polycarbonate tetraols; and derivatives obtained by introducing side chains or branched structures to these, modified products thereof, and also mixtures thereof.

Among these, a polycarbonate-based polyurethane obtained from a polycarbonate-based polyol is excellent in plasticizer resistance and can prevent a plasticizer from moving to the surface-protective film due to contact with a rubber product or the like and causing swelling. Also, a polyester-based polyurethane obtained from a polyester-based polyol is excellent in terms of plasticizer resistance and oil resistance and can prevent various oil components of a plasticizer, sebum, and the like from moving to the surface-protective film and causing swelling.

a1. Polycarbonate-Based Polyol

Examples of polycarbonate-based polyol include reaction products of a dialkyl carbonate and a diol. Also, it is possible to use, as polycarbonate-based polyol, polycarbonate glycols, polycarbonate triols, polycarbonate tetraols, derivatives obtained by introducing side chains or branched structures to these, modified products, and further mixtures thereof, for example.

Examples of the dialkyl carbonate include dialkyl carbonates such as dimethyl carbonate and diethyl carbonate, diaryl carbonates such as diphenyl carbonate, and alkylene carbonates such as ethylene carbonate. One of these may be used alone, or two or more kinds of these may be used together.

Examples of the diol include ethylene glycol, diethylene glycol, 1,4-butanediol, 1,5-pentanediol, 1,6-hexanediol, 1,7-heptanediol, 1,8-octanediol, 2-methyl-1,8-octanediol, 1,9-nonanediol, 1,10-dodecanediol, 2-ethyl-1,6-hexanediol, 3-methyl-1,5-pentanediol, 2,4-dimethyl-1,5-pentanediol, neopentyl glycol, 1,3-cyclohexanediol, 1,4-cyclohxanediol, 1,4-cyclohexanedimethanol, and 2,2'-bis(4-hydroxycyclohexyl)-propane. One of these may be used alone, or two or more kinds of these may be used together. As the diol, aliphatic diols having 4 to 9 carbon atoms or alicyclic diols is preferably used, and for example, it is preferable to use one of 1,4-butanediol, diethylene glycol, 1,5-pentanediol, 1,6-hexanediol, 3-methyl-1,5-pentanediol, 2,4-dimethyl-1, 5-pentanediol, 1,4-cyclohexanedimethanol, 1,7-heptanediol, 1,8-octanediol, 2-methyl-1,8-octanediol, and 1,9-nonanediol alone or two or more kinds of these together. Also, diols not having a branched structure are more suitably used.

a2. Polyester-Based Polyol

Examples of polyester-based polyol include polyester-based polyols obtained through a polymerization reaction of a dibasic acid such as succinic acid, adipic acid, phthalic anhydride, isophthalic acid, maleic acid, or fumaric acid and glycols such as ethylene glycol, propylene glycol, 1,4-butanediol, 1,6-hexanediol, or trimethylolpropane.

Among these, succinic acid ester-based polyurethanes in which succinic acid is utilized as a dibasic acid are particularly excellent in terms of plasticizer resistance and oil resistance and are thus preferably used.

The number average molecular weight of the polyol is preferably equal to or greater than 200 and equal to or less than 10,000, is more preferably equal to or greater than 500 and equal to or less than 5,000, and is further preferably equal to or greater than 800 and equal to or less than 3,000. If the number average molecular weight is less than 200, handleability becomes poor due to an excessively high reaction speed, and a molded material may lose flexibility and become brittle. On the other hand, if the number average molecular weight is greater than 10,000, the viscosity becomes excessively high, which may lead to deterioration of handleability, and a molded material may become crystallized and become turbid. Note that the number average molecular weight means the molecular weight calculated on the basis of a hydroxyl value of a polyol measured in accordance with JIS K1557 in the present invention. However, a number average molecular weight outside the aforementioned numerical ranges is also not excluded unless the gist of the present invention is departed from.

b. Isocyanate

As an isocyanate, a substance having two or more isocyanate groups in a molecule can be used without any particular limitation. For example, it is possible to use tolylene diisocyanate, tolidine diisocyanate, diphenylmethane diisocyanate, polymethylene polyphenyl polyisocyanate, carbodiimide diphenylmethane polyisocyanate, crude diphenylmethane diisocyanate, xylylene diisocyanate, 1,5-naphthalenediisocyanate, tetramethylxylene diisocyanate, isophorone diisocyanate, hydrogenated diphenylmethane diisocyanate, hydrogenated xylylene diisocyanate, hexamethylene diisocyanate, dimer acid diisocyanate, norbornene diisocyanate or the like. Among these, two or more kinds may be used together.

In the present invention, it is preferable to use, as the polyurethane forming the protective layer, an aliphatic isocyanate that does not have an aromatic ring as an isocyanate component. A polyurethane obtained from an aliphatic isocyanate is not likely to change its color to yellow and can prevent transparency from deteriorating due to a color change of polyurethane caused by light or heat from a light source or sunlight.

c. Alcohol-Based Curing Agent

An alcohol-based curing agent is used as a curing agent for the polyurethane forming the protective layer in the present invention. An alcohol-based curing agent adversely affects the human body and the environment less as compared with an amine-based curing agent.

As the alcohol-based curing agent, it is possible to use any alcohol-based curing agent without any limitation as long as the alcohol-based curing agent has two or more hydroxyl groups in a molecule. Examples thereof include dihydric alcohols such as ethylene glycol, 1,3-propanediol, 2-methyl-1,3-propanediol, 1,3-butanediol, 1,4-butanediol, 1,5-pentanediol, neopentyl glycol (2,2-dimethyl-1,3-propanediol), 1,6-hexanediol, polyethylene glycol, polypropylene glycol, polybutylene glycol, cyclohexane dimethanol, hydrogenated bisphenol A, and trihydric alcohols such as glycerin, trimethylolpropane, butanetriol, pentanetriol, hexanetriol, cyclopentanetriol, and cyclohexanetriol, trihydric or higher alcohols such as pentaerythritol, dipentaerythritol, and tetramethylolpropane. Regarding the dihydric alcohol, 1,4-butanediol is preferably used in terms of handleability and mechanical property, and dihydric alcohols having cyclic structures such as cyclohexanedimethanol and hydrogenated bisphenol A are preferably used in terms of prevention of white turbidity, among these. As trihydric alcohols, trimethylolpropane is preferably used in terms of handleability and mechanical property.

In a case in which a dihydric alcohol is used alone as the alcohol-based curing agent, a molded article may be crystallized and become turbid. In a case in which a trihydric alcohol is included as a main constituent, strength may be degraded.

Therefore, it is preferable to use a dihydric alcohol and a trihydric alcohol together. Specifically, it is preferable to use the dihydric alcohol within a range of 50 to 100 parts by weight and the trihydric alcohol within a range of 50 to 0 parts by weight, and it is further preferable to use the dihydric alcohol within a range of 60 to 80 parts by weight and the trihydric alcohol within a range of 40 to 20 parts by weight. Moreover, in a case in which 1,4-butanediol is used as a dihydric alcohol and this leads to white turbidity, it is only necessary to replace a part or entirety of 1,4-butanediol with a dihydric alcohol having a cyclic structure.

d. Catalyst

The polyurethane forming the protective layer in the present invention is preferably thermally cured in the presence of a non-amine-based catalyst. It is possible to obtain a polyurethane that is excellent in terms of non-coloring property, transparency, and weather resistance using the non-amine-based catalyst. On the other hand, a polyurethane thermally cured with an amine-based catalyst may change the color of light which is emitted to yellow and the color of its appearance may change over time.

Examples of the non-amine-based catalyst include organic tin compounds such as di-n-butyltin dilaurate, dimethyltin dilaurate, dibutyltin oxide, and octane tin, organic titanium compounds, organic zirconium compounds, tin carboxylate salts, and bismuth carboxylate salts. Among these, organic tin compounds are preferably used due to ease of adjusting a reaction speed therewith.

It is preferable to add the non-amine-based catalyst such that the amount thereof is equal to or greater than 0.0005% by weight and equal to or less than 3.0% by weight with respect to the total weight of the aforementioned a to c. If the amount is less than 0.0005% by weight, the reaction speed is not sufficiently high, and it may not be possible to efficiently obtain a molded article. If the amount is greater than 3.0% by weight, the reaction speed becomes excessively high, and it is not possible to obtain a molded article with a uniform thickness. Disadvantages that heat resistance or weather resistance of the molded article is degraded, light transmittance is degraded, or the molded article is colored may occur. However, amounts outside the aforementioned numerical ranges are not excluded as long as the gist of the present invention is not departed from.

The polyurethane forming the protective layer may contain, as needed, various additives such as a coloring agent, a light stabilizer, a heat stabilizer, an antioxidant, an antifungal agent, and a flame retardant within a range in which required property is not inhibited.

The protective layer is a molded article constituted of polyurethane obtained by curing a material composition containing at least a polyol, an isocyanate, and an alcohol-based curing agent with a catalyst, and a molding method may be any of a one-shot method, a prepolymer method, and a pseudo prepolymer method.

According to the one-shot method, it is possible to produce a molded article of the polyurethane by combining a polyol, an isocyanate, an alcohol-based curing agent, an arbitrary additive, and a catalyst and curing them.

According to the prepolymer method, it is possible to produce a molded article of the polyurethane by preparing in advance a prepolymer having an isocyanate group at a terminal by causing a reaction of a polyol and a stoichiometrically excess amount of isocyanate, mixing a predetermined amount of alcohol-based curing agent, an arbitrary additive, and a catalyst thereinto, and curing the prepolymer.

According to the pseudo prepolymer method, it is possible to produce a molded article of the polyurethane by mixing in advance a part of polyol into an alcohol-based curing agent, preparing a prepolymer using the remaining polyol and isocyanate, mixing a mixture obtained in advance by mixing a polyol, an alcohol-based curing agent, an arbitrary additive, and a catalyst, thereinto, and curing the mixture.

In the present invention, a ratio (—OH/—NCO; hereinafter, referred to as an α ratio) between the number of moles of hydroxyl groups (—OH) contained in the alcohol-based curing agent and the number of moles of isocyanate groups (—NCO) of isocyanate or the prepolymer in the material composition before the polyurethane is thermally cured is preferably equal to or greater than 0.80 and equal to or less than 1.50, is more preferably equal to or greater than 0.90 and equal to or less than 1.45, and is further preferably equal to or greater than 1.02 and equal to or less than 1.4. If the ratio is less than 0.80, mechanical property becomes unstable. If the ratio is greater than 1.50, surface adhesiveness increases, and satisfactory writing performance deteriorates.

In addition, the polyurethane preferably does not contain an acrylic skeleton (an acrylic skeleton or a methacrylic skeleton). In other words, the polyurethane forming the protective layer according to the present invention preferably does not contain an acryl-modified polyurethane. A polyurethane having an acrylic skeleton may lead to deterioration of flexibility of the polyurethane and deterioration of mechanical strength such as abrasion resistance and tear strength. Also, an acrylic skeleton or a residue of a catalyst used to introduce the acrylic skeleton may lead to coloring of emitted light.

In the present invention, both the surfaces of the protective layer are flat. This is because the material composition is thermally cured in a state in which the material composition is sandwiched between gap maintaining members with flat surfaces and forms the protective layer, as will be described below in detail for the manufacturing method. Note that the expression that the protective layer is flat means that the arithmetic average roughness Ra is equal to or less than 0.05 μm in the present invention.

The thickness of the protective layer is preferably equal to or greater than 50 μm and equal to or less than 300 μm and is more preferably equal to or greater than 100 μm and equal to or less than 200 μm. Writing performance and sliding property of a touch pen become significantly satisfactory, and excellent operability and self-recovery property can also be achieved, by the protective layer having a thickness of equal to or greater than 50 μm and equal to or less than 300 μm. If the thickness of the protective layer is less than 50 μm, writing performance and self-recovery property are degraded. If the thickness of the protective layer is greater than 300 μm, writing performance, sliding property, operability, and self-recovery property are degraded, and it becomes difficult to obtain a molded article with a uniform thickness. If the thickness is equal to or greater than 50 μm and equal to or less than 300 μm, performance required for the surface-protective film is exhibited with a satisfactory balance, and is possible to facilitate the manufacturing.

"Hardcoat Layer"

The hardcoat layer is provided on one of the surfaces of the protective layer, and the arithmetic average roughness Ra thereof is equal to or greater than 0.1 μm and equal to or less than 0.8 μm.

The hardcoat layer can be formed by irradiating an ionizing radiation curable resin composition with ultraviolet radiation, an electron beam, or the like, causing polymerization, and curing the composition. As the ionizing radiation curable resin composition forming the hardcoat layer (hereinafter, also referred to as a resin composition), a known composition can be used, and examples thereof include a resin composition containing, as a main constituent, polyfunctional polymerizable monomers having two or more ionizing radiation polymerizable functional groups such as (meth)acrylic groups, vinyl groups, allyl groups, or styryl groups in one molecule and containing a photopolymerization initiator, a levelling agent, and the like.

Examples of the polyfunctional polymerizable monomer include pentaerythritol triacrylate, pentaerythritol tetraacrylate, dipentaerythritol hexaacrylate, neopentyl glycol diacrylate, triethylene glycol diacrylate, bis(acryloxyethoxy)bisphenol A, and trimethylolpropane triacrylate. Also, one of the polyfunctional polymerizable monomers may be used alone, or two or more kinds may be used in combination.

The resin composition forming the hardcoat layer preferably contains a fluorine-containing compound. It is possible to improve oil resistance and contamination proofing property by the hardcoat layer located on the frontmost surface containing the fluorine-containing compound in the surface-protective film according to the present invention. The fluorine-containing compound is not particularly limited, and it is possible to use a fluorine-based leveling agent, a fluorine-containing monomer, a silane coupling agent containing fluorine atoms, or the like. However, a fluorine-containing monomer capable of forming a covalent bond with a polyfunctional polymerizable monomer is preferably used. Examples of the fluorine-containing monomer include a compound having a fluorohydrocarbon group such as a fluoroalkyl group, a fluorooxyalkyl group, or a fluoroalkenyl group and an ionizing radiation polymerizable functional group such as a (meth)acrylic group, a vinyl group, an allyl group, or a styryl group. Also, examples of a commercially available product include trifluoroethyl methacrylate (LIGHT ESTER M-3F), a superhigh hardness hardcoat agent (HX-RPH), a super-scratch-resistant hardcoat agent (HX-RSC) manufactured by Kyoeisha Chemical Co., Ltd., an anti-fingerprint agent manufactured by Daikin Industries, Ltd. (OPTOOL DAC), and a UV-reactive surface modifier (MEGAFACE RS series) manufactured by DIC Corporation.

The hardcoat layer has an arithmetic average roughness Ra of equal to or greater than 0.1 μm and equal to or less than 0.8 μm. It is possible to apply antiglare property to the surface-protective film due to the arithmetic average roughness Ra of the hardcoat layer falling within the aforementioned range. Also, if scratching occurs in the surface of the surface-protective film with the antiglare property, the scratch is not noticeable. The arithmetic average roughness Ra is preferably equal to or greater than 0.3 μm and equal to or less than 0.7 μm and is further preferably equal to or greater than 0.4 μm and equal to or less than 0.6 μm The thickness of the hardcoat layer is preferably equal to or greater than 0.5 μm and equal to or less than 5 μm. The surface-protective film according to the present invention obtains excellent oil resistance and scratch resistance by the thickness of the hardcoat layer falling within the aforementioned range. If the thickness of the hardcoat layer is less than 0.5 μm, oil resistance may be degraded. If the thickness of the hardcoat layer is greater than 5 μm, the rigid hardcoat layer cannot follow motion of the flexible protective layer, and peeling may occur between the hardcoat layer and the protective layer, or the hardcoat layer may crack. The thickness of the hardcoat layer is preferably equal to or greater than 1 μm and equal to or less than 3 μm. Note that the thickness of the hardcoat layer means a weighted average of thicknesses measured at arbitrary 10 points in an image obtained by imaging a section of the surface-protective film in the thickness direction using an electron microscope or the like, in the specification.

"Transparent Base Material Film"

The transparent base material film is for holding the protective layer. Any material can be used to configure the transparent base material film with no particular limitation as long as the material is excellent in terms of transparency, flexibility, and mechanical strength, and it is possible to suitably use polyethylene terephthalate (PET), polyethylene naphthalate (PEN), polycarbonate (PC), a cyclic olefin-based resin (COP), polyimide (PI), or the like.

The thickness of the transparent base material film is preferably equal to or greater than 50 μm and equal to or less than 500 μm. Since a thermal expansion coefficient of the polyurethane forming the protective layer is typically greater than a thermal expansion coefficient of the material configuring the transparent base material film in the surface-protective film according to the present invention, the transparent base material film cannot oppose contraction of the protective layer at a low temperature, and the surface-protective film may peel off from the transparent substrate if the thickness of the transparent base material film is less than 50 μm. If the thickness of the transparent base material film is greater than 500 μm, the surface protective film increases in size, and this leads to an increase on costs. Moreover, operability when the surface-protective film is attached to a touch panel-type display surface is degraded. Note that the protective layer can be molded directly on the transparent base material film as will be described later in detail in "Method for manufacturing surface protective film". In a case in which the manufacturing method is used, the transparent base material film is preferably thick in order to prevent deformation when the material composition is thermally cured to obtain the protective layer. However, the thickness outside the aforementioned numerical range is not excluded unless the gist of the present invention is departed from.

"Adhesive Layer"

The adhesive layer is for attaching the surface-protective film to the transparent substrate on the display surface. The type of the adhesive is not particularly limited, and it is possible to use an acrylic resin, an epoxy-based resin, a urethane-based resin, a silicone-based resin, or the like. Among these, an acrylic resin enables attachment even to a transparent substrate on which a surface treatment such as a contamination-proofing treatment or a low-reflection treatment has been performed. Also, the silicone-based resin provides excellent wetting property, is unlikely to generate air bubbles at the time of the attachment to the transparent substrate, provides satisfactory re-peeling property, and is not likely to leave glue after the peeling-off. Although the thickness of the adhesive layer is typically within a range of equal to or greater than 5 μm and equal to or less than 60 μm, it is possible to appropriately adjust the thickness in accordance with a required specification.

"Surface-Protective Film"

The surface-protective film 10 according to an embodiment includes the four layers, namely the hardcoat layer 1, the protective layer 2 constituted of a polyurethane, the transparent base material film 3, the adhesive layer 4 laminated in sequence. The surface-protective film according to the present invention may include other layers and can include a blue light cutting layer for cutting blue light, for example.

The total light transmittance of the surface protective film is preferably equal to or greater than 90% in terms of visibility. However, in a case in which a blue light cutting function for cutting off visible light in a blue-color region is provided, the total light transmittance is preferably equal to or greater than 60%.

A haze value of the surface-protective film is preferably equal to or greater than 5% and equal to or less than 40% in terms of antiglare property. The haze value of the surface-protective film is more preferably equal to or greater than 10% and equal to or less than 30% and is further preferably equal to or greater than 15% and equal to or less than 25%.

Figure 3:
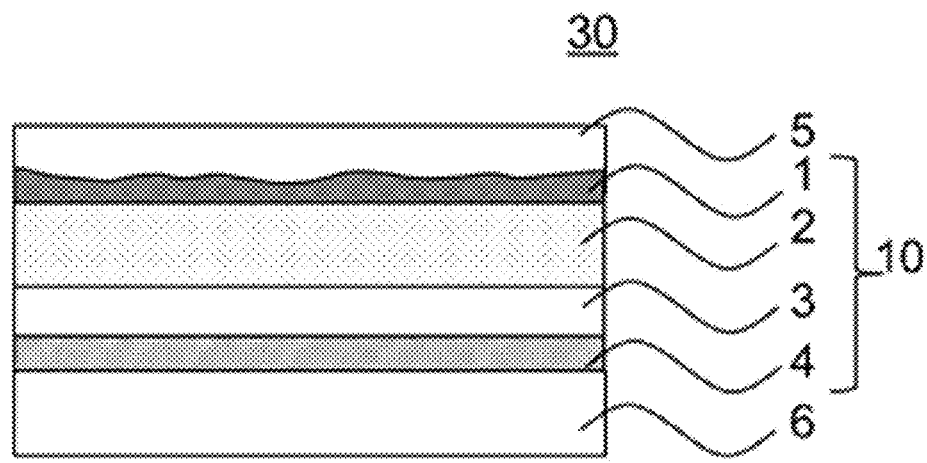
FIG. 3 is a diagram illustrating a surface-protective film laminate.

In order to protect the surface-protective film according to the present invention until the surface-protective film is attached to the transparent substrate and is then used after production, it is possible to obtain a surface-protective film laminate by attaching a mold releasing film and releasing film to the surfaces of the surface-protective film on the side of the hardcoat layer and on the side of the adhesive layer, respectively. FIG. 3 illustrates a surface-protective film laminate 30 obtained by attaching a mold releasing film 5 and a releasing film 6 to the surface-protective film 10 according to an embodiment. Note that in FIG. 3, the thickness of each layer does not indicate the actual thickness.

The mold releasing film is for preventing contamination, dust adhesion, scratching, and the like from occurring in the hardcoat layer located on the frontmost surface. As will be described later in detail in the manufacturing method, the mold releasing film is an unevenness transfer film obtained by transferring unevenness with an arithmetic average roughness Ra of equal to or greater than 0.1 μm and equal to or less than 0.8 μm to the surface of the hardcoat layer. Therefore, as the mold releasing film (unevenness transfer film), it is preferable to use a film with a surface, on which a mold releasing treatment has been performed, on the side on which the film is to be attached to the hardcoat layer. If the mold releasing film on which the mold releasing treatment has been performed is peeled off from the hardcoat layer, then the mold releasing agent included in the mold releasing film is shifted to the surface of the hard coat layer, and it is possible to apply slipping property to the surface of the hard coat layer immediately after the mold releasing film is peeled off and thereby to enable a touch operation to be performed without any unpleasant feeling right after utilization is started.

The releasing film is for preventing contamination, dust adhesion, degradation of adhesion force, and the like of the adhesive layer. The releasing film is not particularly limited, and it is possible to suitably use a film with a surface, on which a mold releasing treatment has been performed, on the side on which the releasing film is attached to the adhesive layer.

"Method for Manufacturing Surface-Protective Film"

Figure 4:
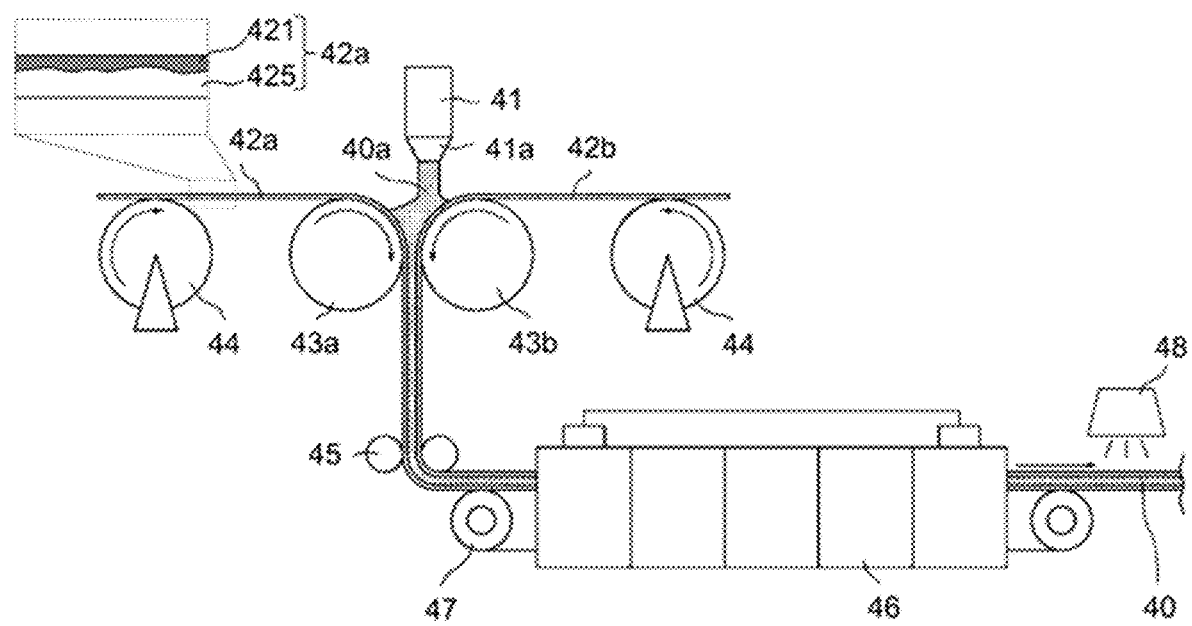
FIG. 4 is a diagram illustrating a method for manufacturing a protective layer of the surface-protective film.

FIG. 4 illustrates a schematic view of a method for manufacturing the surface-protective film. Hereinafter, the manufacturing method will be described using FIG. 4.

An ionizing radiation curable resin composition is applied to an uneven surface of an unevenness transfer film 425, the ionizing radiation curable resin composition is half-cured to obtain a half-cured hardcoat layer 421, and a first gap maintaining member 42a with the half-cured hardcoat layer 421 laminated on the unevenness transfer film 425 is prepared in advance.

The first gap maintaining member 42a and a second gap maintaining member 42b are disposed such that the half-cured hardcoat layer 421 faces the second gap maintaining member 42b and are successively fed by a pair of rolls 43a and 43b disposed away from each other, and a material composition 40a is poured into the clearance between the first and second gap maintaining members 42a and 42b via a casting machine 41.

The first and second gap maintaining members 42a and 42b are guided to the inside of a heating device 46 in a state in which the material composition 40a is held therebetween. The material composition 40a is thermally cured in a state in which the material composition 40a is held between the first and second gap maintaining members 42a and 42b, and a polyurethane sheet-shaped product 40 is thus obtained. The facing surfaces of the first and second gap maintaining members are flat, the material composition 40a is thermally cured in a state in which the material composition 40a is held between the flat surfaces, and the flat polyurethane sheet-shaped product 40 can thus be manufactured. Next, the half-cured hardcoat layer 421 is irradiated with an ultraviolet ray by an ultraviolet irradiation device 48 and is fully cured.

Note that in FIG. 4, 44 denotes a transport roll for feeding the first and second gap maintaining members 42a and 42b, 45 denotes an auxiliary roll, and 47 denotes a conveyor belt for transporting the first and second gap maintaining members 42a and 42b holding the material composition 40a therebetween inside the heating device 46.

For the unevenness transfer film 425 at the first gap maintaining member 42a and the second gap maintaining member 42b, any materials can be used without particular limitation as long as the materials are not thermally deformed when the material composition is thermally cured. For example, it is possible to use a long film constituted of a polymer material such as polyethylene terephthalate (PET), polyethylene naphthalate (PEN), polycarbonate (PC), a cyclic olefin-based resin (COP), or polyimide (PI). Note that although a long film constituted of a polymer material is used as the second gap maintaining member 42b in the schematic view illustrated in FIG. 4, it is also possible to use an endless belt made of these polymer materials or metal materials such as aluminum.

Since the first and second gap maintaining members 42a and 42b are pulled and transported with the same tensile force with the material composition 40a held therebetween, it is possible to maintain the clearance to have a constant size. The material composition 40a is cured in a state in which the material composition 40a is sandwiched between the first and second gap maintaining members 42a and 42b and maintains a constant thickness, thereby forming a polyurethane sheet-shaped product 40 with excellent thickness precision. Also, the half-cured hardcoat layer 421 has been half cured and has lost fluidity, the material composition 40a is thermally cured in a state in which the material composition 40a is sandwiched between the flat surfaces, and the polyurethane sheet-shaped product 40 with both flat surfaces is thus obtained. It is possible to continuously mold the sheet-shaped product 40 with optical property that is practical as a protective layer of the surface-protective film and with a thickness of equal to or greater than 50 µm, which is difficult to be achieved through application, by the manufacturing method.

The position of a head portion 41a of the casting machine 41 is preferably localized on a side of any one of transport rolls from the center (the center of the clearance formed by the first and second gap maintaining members 42a and 42b) between the transport rolls 43a and 43b, and also, the localizing distance is preferably equal to or less than the radius of the transport rolls. In other words, a portion immediately below the head portion 41a of the casting machine 41 is preferably located between the center of the pair of transport rolls 43a and 43b to the center axis of the one of the transport rolls. Also, the shortest distance between the distal end portion of the head portion 41a and the surface of the transport roll is preferably equal to or less than 5 cm. Thickness precision of the polyurethane sheet-shaped product 40 is further improved, air bubbles are unlikely to be mixed in the uncured material composition 40a poured into the clearance between the first and second gap maintaining members 42a and 42b, and mixed air bubbles are likely to escape, by the head portion 41a being disposed in this manner.

Although the transport rolls 43a and 43b may have simply have a transport function alone, the transport rolls 43a and 43b are preferably heating rolls. If the transport rolls are heating rolls, the material composition 40a can start hardening immediately after the material composition 40a is held in the clearance between the first and second gap maintaining members 42a and 42b, and it is possible to uniformly maintain the thickness until the material composition 40a is introduced into the heating device 46 and to mold the polyurethane sheet-shaped product 40 with more excellent thickness precision. The transport surface temperature when the transport rolls 43a and 43b are heated is preferably set to be equal to or greater than 10° C. and equal to or less than 60° C. If the transport surface temperature is less than 10° C., the viscosity of the material composition 40a becomes high, air bubbles is unlikely to escape, the hardening reaction is slowed down, and thickness precision of the sheet-shaped product 40 is degraded. If the transport surface temperature exceeds 60° C., the material composition 40a may be hardened on the transport rolls, or air bubbles may be mixed in the sheet-shaped material 40.

The heating device 46 may be any heating furnace that is provided with a heater and can boost the temperature in the furnace up to a hardening temperature of the material composition 40a. Also, heating conditions (hardening conditions) inside the heating device 46 are not particularly limited and may appropriately be set in accordance with the composition of the material composition 40a, and for example, the heating may be performed under conditions of equal to or greater than 40° C. and equal to or less than 160° C. and of equal to or greater than 1 minute and equal to or less than 180 minutes.

A long laminate including the first gap maintaining member 42a, the polyurethane sheet-shaped product 40, and the second gap maintaining member 42b is transported out of the heating device 46.

The ultraviolet irradiation device 48 is for irradiating the long laminate transported out of the heating device 46 with ultraviolet rays to fully cure the half-cured hard coat layer 421. Examples of an ultraviolet ray source include an ultraviolet fluorescent lamp, a low-pressure mercury lamp, a high-pressure mercury lamp, a superhigh-pressure mercury lamp, and a xenon lamp. The ultraviolet ray can be emitted in any manner as long as the ultraviolet ray can reach the half-cured hardcoat layer, and irradiation may be performed on any of the sides of the first gap maintaining member 42a and the second gap maintaining member 42b or on the both sides.

"Method for Manufacturing Surface-Protective Film Laminate"

In the aforementioned manufacturing method, the first gap maintaining member 42a includes the unevenness transfer film 425, and it is possible to manufacture the hardcoat layer 1 with the uneven surface by peeling off the unevenness transfer film 425. At this time, it is possible to cause the second gap maintaining member 42b to serve as the transport base material film 3 of the surface-protective film and cause the unevenness transfer film 425 to serve as the mold releasing film 5 of the surface-protective film laminate.

Then, the adhesive layer 4 is formed on the surface of the second gap maintaining member 42b through application or the like, the releasing film 6 is attached to the adhesive layer 4, and it is thus possible to obtain a long surface-protective film laminate 30.

Note that the method for manufacturing the surface-protective film laminate described above is just an example, and it is also possible to use, as the second gap maintaining member 42b, a laminate including a transparent base material film/an adhesive layer/a releasing film laminated in sequence, for example.

According to the manufacturing method, it is possible to continuously manufacture the surface-protective film laminate 30 in a so-called roll-to-roll manner. Since the thus manufactured surface-protective film laminate 30 includes the mold releasing film 5 and the releasing film 6 on its both surfaces, it is possible to prevent scratching, contamination, and the like of the surface-protective film and to achieve excellent handleability. Note that although the surface-protective film laminate can be manufactured in the roll-to-roll manner throughout the manufacturing process as described above, it is also possible to form the adhesive layer after cutting.

The surface-protective film laminate may be rolled into a roll shape and shipped or may be cut into sheet shapes and shipped. Moreover, it is also possible to ship the long laminate including the first gap maintaining member 42a, the polyurethane sheet-shaped product 40, and the second gap maintaining member 42b or a sheet-shaped laminate obtained by cutting the long laminate and to form the adhesive layer in a display factory or the like.

EXAMPLES

Hereinafter, although the present invention will be described in more detail through examples, the present invention is not limited only to the examples.

Example 1

100 g of poly(1,6-hexanecarbonate) diol (manufactured by Tosoh Corporation, product name: 980R) with a molecular weight of 2000 and with a hydroxyl value of 55, 48.0 g of isophorone diisocyanate, 16.0 g ($\alpha$ ratio=1.05) of alcohol-based curing agent constituted of 1,4-butanediol/trimethylolpropane with a weight ratio of 60/40, and 250 ppm of organic tin compound as a non-amine-based catalyst were added, stirred, and mixed, thereby obtaining a material composition.

PET with an uneven surface siliconized as an unevenness transfer film with a thickness of 125 μm was used, UV curable urethane acrylate containing a fluorine-containing monomer was applied to the uneven surface to obtain a thickness of 2.3 μm, a heat treatment was performed at 80° C. for 1 min, and the obtained product was irradiated with ultraviolet rays at 150 mJ/cm$^2$ and was half cured, thereby obtaining a half-cured hardcoat layer.

The material composition was sandwiched between PET with a thickness of 100 μm, which served as a transparent base material film, and the PET with a thickness of 125 μm provided with the half-cured hardcoat layer by the aforementioned molding method, the material composition was heated at 80° C. for 12 hours and was thermally cured, and an obtained product was irradiated with ultraviolet rays at 800 mJ/cm$^2$ to fully cure the half-cured hardcoat layer, thereby manufacturing a laminate of the unevenness transfer film/the hardcoat layer/the protective layer (thickness of 150 μm)/the transparent base material film.

Example 2

A laminate was manufactured similarly to Example 1 other than that the thickness of the hardcoat layer was set to 1.7 μm.

Example 3

A laminate was manufactured similarly to Example 1 other than that the thickness of the hardcoat layer was set to 1.4 μm.

Comparative Example 1

PET with an uneven surface siliconized as an unevenness transfer film with a thickness of 125 μm and PET with a thickness of 100 μm as a transparent base material film were used, and the same material composition as that in Example 1 sandwiched therebetween was heated at 80° C. for 12 hours and was thermally cured, thereby manufacturing a laminate of the unevenness transfer film/the protective layer (thickness of 150 μm)/transparent base material film.

The unevenness transfer film was peeled off from the laminate, the UV curable urethane acrylate containing the fluorine-containing monomer used in Example 1 was applied to the exposed surface of the protective layer to obtain a thickness of 2.3 μm, and the obtained product was thermally treated at 80° C. for 1 min and was then irradiated with ultraviolet rays at 800 mJ/cm$^2$ to fully cure the product, thereby manufacturing a laminate of the hardcoat layer/the protective layer (thickness of 150 μm)/the transparent base material film.

Comparative Example 2

A laminate was manufactured similarly to Comparative Example 1 other than that the thickness of the hardcoat layer was set to 1.7 µm.

Comparative Example 3

A laminate was manufactured similarly to Comparative Example 1 other than that the thickness of the hardcoat layer was set to 1.4 µm.

Comparative Example 4

A laminate was manufactured similarly to Example 1 other than that the thickness of the hardcoat layer was set to 16 µm.

Comparative Example 5

A laminate was manufactured similarly to Comparative Example 4 other than that an unevenness transfer film with smaller Ra was used.

Each of the surface-protective films manufactured as described above was evaluated as follows. Results are illustrated in Table 2.

—Arithmetic Average Roughness (Ra)

The surface shape of the hardcoat layer of each laminate manufactured as described above was measured at arbitrary locations three times in accordance with JIS B0601-2001 using a surface roughness measuring instrument (manufactured by Mitsutoyo Corporation, device name: SURFTEST SV-3000), arithmetic average roughness (Ra) was obtained using an accessory surface roughness analysis program (SURFPAK-SV), and an average value was calculated. Measurement conditions and evaluation conditions are illustrated in Table 1 below.

TABLE 1

| Measurement conditions | |
| --- | --- |
| Measurement length | 15 mm |
| Range | 80.0 µm |
| Speed | 1.0 mm/s |
| Rounded surface automatic measurement | Off |
| Overrange | Interrupted |
| Pitch | 1.0 µm |
| Number of measurement points | 15000 |
| Detector | Detector (0.75 mN specification) |
| Stylus | Standard (SQ) (12AAC731-2AAC753) |

TABLE 1-continued

| Evaluation conditions | |
| --- | --- |
| Standard | JISB 0601-2001 |
| Evaluation curve type | R_J01 |
| Reference length | 2.5 mm |
| Number of sections | 5 |
| Cut-off value λc | 2.5 mm |
| Cut-off value λs | 0.008 mm |
| Filter type | Gaussian |
| Evaluation length | 12.5 mm |
| Forward range | 1.25 mm |
| Rearward range | 1.25 mm |
| Smooth connection | Off |

—Haze, Total Light Transmittance

A sample of 5 cm square was cut out of each produced laminate, the unevenness transfer film was peeled off, the sample was set such that the surface on the side of the hardcoat layer was placed on the side of a light source, and measurement was performed using a haze meter (manufactured by Nippon Denshoku Industries, Co., Ltd., device name: NDH7000 (CU-II specification)).

—Oil Resistance

One drop of oleic acid and a commercially available emulsion (manufactured by Ryohin Keikaku Co., Ltd., emulsion for balanced skin) was dropped to the hardcoat layer. The oleic acid and the emulsion were completely wiped off 1 day, 3 days, and 7 days after the dropping, and the dropping location was visually checked and evaluated using the following criteria.

5: There was no contact mark.
4: An outline was seen if reflection was caused.
3: An outline was slightly seen.
2: An outline was clearly seen.
1: The dropping location swelled.

—Antiglare Property

Light of an indoor fluorescent lamp was caused to be reflected on the surface on the side of the hardcoat layer, and how the fluorescent light became blurred was evaluated in five levels.

5: The outline of the fluorescent lamp was not seen at all.
4: The outline of the fluorescent lamp was substantially not seen.
3: The outline of the fluorescent lamp was slightly seen.
2: The outline of the fluorescent lamp was substantially seen.
1: The outline of the fluorescent lamp was clearly seen.

—Cracking

Whether cracking occurred in the sheet surface when the protective sheet was wound around a shaft of ϕ6 mm was visually checked.

O: No cracking was observed.
X: Cracking was observed.

TABLE 2

| | Example 1 | Example 2 | Example 3 | Comparative Example 1 | Comparative Example 2 | Comparative Example 3 | Comparative Example 4 | Comparative Example 5 |
| --- | --- | --- | --- | --- | --- | --- | --- | --- |
| Thickness of hardcoat layer (µm) | 2.3 | 1.7 | 1.4 | 2.3 | 1.7 | 1.4 | 16 | 16 |
| Arithmetic average roughness Ra (µm) | 0.437 | 0.474 | 0.476 | 0.012 | 0.024 | 0.025 | 0.496 | 0.276 |
| Haze (%) | 17.7 | 24.0 | 21.9 | 0.5 | 0.5 | 0.5 | 13.8 | 13.9 |

TABLE 2-continued

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Total light emission (%) | 90.6 | 90.6 | 90.6 | 92.0 | 92.0 | 92.0 | 91.0 | 91.0 |
| Oil resistance (oleic acid) | 5 | 5 | 5 | 5 | 5 | 5 | 5 | 5 |
| Oil resistance (emulsion) | 5 | 5 | 5 | 5 | 5 | 5 | 5 | 5 |
| Antiglare property | 5 | 5 | 5 | 1 | 1 | 1 | 5 | 5 |
| Cracking | O | O | O | O | O | O | X | X |

The surface-protective films in Examples 1 to 3 corresponding to the present invention had uneven hardcoat layer surfaces and thus had satisfactory antiglare property. Also, the surface-protective films were excellent in terms of oil resistance, and the hardcoat layers were able to follow motion of the protective layers.

On the other hand, the surface-protective films in Comparative Examples 1 to 3 in which the hardcoat layers were applied to the protective layer with the uneven surfaces had small arithmetic average roughness since the uneven surfaces of the protective layers were buried in the hardcoat layer, and antiglare property was thus degraded.

In the surface-protective films in Comparative Examples 4 and 5, cracking occurred due to the thick hardcoat layers that were not able to follow motion of the protective layers.

The invention claimed is:

1. A surface-protective film comprising:
a protective layer comprising a polyurethane, both surfaces of the protective layer being flat, wherein the protective layer is a cured product of a polycarbonate-based polyol, an isocyanate, and an alcohol-based curing agent, a number average molecular weight of the polycarbonate-based polyol is equal to or greater than 500 and equal to or less than 5,000, the alcohol-based curing agent contains 50 to 100 parts by weight of a dihydric alcohol and 50 to 0 parts by weight of a trihydric alcohol; and
a hardcoat layer formed on one of the surfaces of the protective layer,
wherein the hardcoat layer has an unevenness with an arithmetic average roughness Ra of equal to or greater than 0.1 μm and equal to or less than 0.8 μm on a surface of the hardcoat layer,
wherein the unevenness is formed by transferring an unevenness transfer film having unevenness with an arithmetic average roughness Ra of equal to or greater than 0.1 μm and equal to or less than 0.8 μm,
wherein a ratio (—OH/—NCO) between a number of moles of hydroxyl groups (—OH) contained in the alcohol-based curing agent and a number of moles of isocyanate groups (—NCO) of the isocyanate (α ratio) is equal to or greater than 1.02 and equal to or less than 1.4.

2. The surface-protective film according to claim 1, wherein the thickness of the protective layer is equal to or greater than 50 μm and equal to or less than 300 μm.

3. The surface-protective film according to claim 1, wherein the thickness of the hardcoat layer is equal to or greater than 0.5 μm and equal to or less than 5 μm.

4. The surface-protective film according to claim 1, wherein the hardcoat layer comprises a hardened product of an ionizing radiation curable resin composition containing a fluorine-containing compound.

5. The surface-protective film according to claim 1, wherein a transparent base material film comprising a resin other than a polyurethane is provided on the other surface of the protective layer.

6. A surface-protective film laminate comprising:
a mold releasing film laminated on the surface of the surface-protective film according to claim 1 on the side of the hardcoat layer; and
a releasing film laminated on the other surface of the surface-protective film.

7. A method for manufacturing a surface-protective film, wherein the surface-protective film comprises a protective layer comprising a polyurethane, both surfaces of the protective layer being flat and a hardcoat layer being formed on one of the surfaces of the protective layer, in which the hardcoat layer has unevenness with an arithmetic average roughness Ra of equal to or greater than 0.1 μm and equal to or less than 0.8 μm on a surface of the hardcoat layer, the method for manufacturing the surface-protective film comprising:
applying to an ionizing radiation curable resin composition to an uneven surface of an unevenness transfer film and half-curing the ionizing radiation curable resin composition to form a first gap maintaining member including a half-cured hardcoat layer;
continuously feeding the first gap maintaining member and a second gap maintaining member using a pair of rolls separately disposed in a state in which the half-cured hardcoat layer faces the second gap maintaining member and pouring a material composition into a clearance between the first gap maintaining member and the second gap maintaining member;
thermally curing the material composition in a state in which the material composition is held between the first maintaining member and second gap maintaining member to obtain the protective layer, wherein the protective layer is a cured product of a polycarbonate-based polyol, an isocyanate, and an alcohol-based curing agent, a number average molecular weight of the polycarbonate-based polyol is equal to or greater than 500 and equal to or less than 5,000, the alcohol-based curing agent contains 50 to 100 parts by weight of a dihydric alcohol and 50 to 0 parts by weight of a trihydric alcohol; and
fully curing the half-cured hardcoat layer to obtain the hardcoat layer,
wherein the unevenness is formed by transferring an unevenness transfer film having unevenness with an arithmetic average roughness Ra of equal to or greater than 0.1 μm and equal to or less than 0.8 μm, wherein a ratio (—OH/—NCO) between a number of moles of hydroxyl groups (—OH) contained in the alcohol-based curing agent and a number of moles of isocyanate groups (—NCO) of the isocyanate (α ratio) is equal to or greater than 1.02 and equal to or less than 1.4.

8. The method for manufacturing a surface protective film according to claim 7, wherein the ionizing radiation curable resin composition contains a fluorine-containing compound.

* * * * *